US 6,732,846 B2

(12) United States Patent
Diemer et al.

(10) Patent No.: US 6,732,846 B2
(45) Date of Patent: May 11, 2004

(54) FRICTION CLUTCH

(75) Inventors: Matthias Diemer, Niederwerrn (DE); Andreas Orlamünder, Schweinfurt (DE); Andreas Dau, Würzburg (DE)

(73) Assignee: Mannesmann Sachs AG, Schweinfurt (DE)

( * ) Notice: Subject to any disclaimer, the term of this patent is extended or adjusted under 35 U.S.C. 154(b) by 66 days.

(21) Appl. No.: 09/906,562

(22) Filed: Jul. 16, 2001

(65) Prior Publication Data

US 2002/0014386 A1 Feb. 7, 2002

(30) Foreign Application Priority Data

Aug. 7, 2000 (DE) .......................... 100 38 411

(51) Int. Cl.⁷ ........................ F16D 13/60; F16D 13/38
(52) U.S. Cl. .............................. 192/107 R; 192/107 M; 192/70.14
(58) Field of Search ................ 192/52.6, 107 C, 192/70.14, 70.27, 89.23, 107 R, 107 M; 188/73.37, 73.1

(56) References Cited

U.S. PATENT DOCUMENTS

| | | | | |
|---|---|---|---|---|
| 1,423,833 A | * | 7/1922 | Craighead | 192/107 R |
| 2,806,570 A | * | 9/1957 | Markus | 192/107 R |
| 3,378,115 A | * | 4/1968 | Stephens, III | 188/218 A |
| 3,398,822 A | | 8/1968 | Eakin | |
| 3,477,551 A | * | 11/1969 | Buechle et al. | 188/250 B |
| 3,575,270 A | * | 4/1971 | Wagenfuhrer et al. | 188/218 A |
| 3,664,472 A | * | 5/1972 | Martini et al. | 192/107 M |
| 4,533,032 A | | 8/1985 | Lamarche | 192/107 M |
| 4,557,360 A | * | 12/1985 | Kumatani | 192/107 R |
| 4,913,410 A | * | 4/1990 | Marshall | 188/268 |
| 5,099,973 A | | 3/1992 | Flotow et al. | 192/70.12 |
| 5,154,683 A | | 10/1992 | Phelps | 192/70.14 |
| 5,727,665 A | | 3/1998 | Gonia et al. | 192/70.14 |
| 5,975,252 A | * | 11/1999 | Suzuki et al. | 188/1.11 W |
| 6,109,399 A | * | 8/2000 | Crawford et al. | 188/24.11 |
| 6,158,560 A | * | 12/2000 | Dehrmann | 192/107 C |

FOREIGN PATENT DOCUMENTS

JP 03134331 A * 6/1991 ........... F16D/69/02

OTHER PUBLICATIONS

Search Report, UK Patent Office, Oct. 23, 2001, Examiner Mike Mckinney.

* cited by examiner

Primary Examiner—Saul Rodriquez
Assistant Examiner—Eric M Williams
(74) Attorney, Agent, or Firm—Cohen, Pontani, Lieberman & Pavane

(57) ABSTRACT

A friction clutch comprising a flywheel having a rotational axis; a housing assembly which can be fixed to the flywheel for rotation in common about the rotational axis; a pressure plate mounted in the housing assembly so that it is free to move in the axial direction but is essentially unable to rotate relative to the housing; an energy storing device for loading the pressure plate toward the flywheel; a clutch disk assembly with an area located between the pressure plate and the flywheel, and an intermediate friction lining element assembly to transmit torque. The friction lining element assembly includes at least one friction lining element on the flywheel and/or at least one such element on the pressure plate.

13 Claims, 2 Drawing Sheets

FRICTION CLUTCH

BACKGROUND OF THE INVENTION

1. Field of the Invention

The present invention pertains to a friction clutch, comprising a flywheel; a housing assembly, which is or can be connected to the flywheel for rotation in common around a rotational axis; a pressure plate, which is installed in the housing assembly so that it can move in the axial direction but is essentially unable to rotate with respect to the housing; an energy-producing device, by means of which the pressure plate is or can be pretensioned toward the flywheel; and a clutch disk assembly with an area located between the pressure plate and the flywheel which can be acted upon via an intermediate friction lining element assembly to transmit torque.

2. Description of the Related Art

The conventional friction clutches known in the state of the art consist basically of a design in which the surfaces of the pressure plate and the flywheel, which are made of metal, are provided with friction surfaces, which are opposed by friction linings attached to the clutch disk. This is a practical arrangement, because most of the wear usually occurs in the area of the friction linings, and when they are worn down, only the clutch disk needs to be replaced.

SUMMARY OF THE INVENTION

It is the object of the present invention to improve the friction clutch of the general type in question in such a way that the operating behavior of the drive system equipped with a friction clutch of this type is improved.

According to the present invention, the friction lining element assembly comprises at least one friction lining element on the flywheel and/or at least one friction lining element on the pressure plate.

In a departure from the known approach taken in the state of the art, the present invention now locates the friction linings on the flywheel or on the pressure plate; that is, in terms of the torque being transmitted from the drive assembly, the friction linings are shifted to the input side of the friction clutch. In terms of operation, this results in two significant advantages. The first advantage is that the clutch disk connected via a transmission input shaft to the transmission can be designed to weigh less and to have a lower moment of inertia. This leads to a decrease in the inertia on the transmission input side, as a result of which the length of the synchronization phase required during the shifting of gears can be decreased. The second advantage is that, by shifting the friction linings to the clutch input side, the mass and the moment of inertia there are increased, with the advantage that, in the area of the drive assemblies, any rotational irregularities which may develop can be absorbed more effectively by the much larger rotating mass.

For example, it is possible to provide a plurality of friction lining elements on the pressure plate and/or on the flywheel, these elements proceeding in sequence around the circumference.

To fix each friction lining element in place, for each friction lining element provided on the pressure plate or on the flywheel, a recess can be provided in the pressure plate or in the flywheel which holds a certain area of the friction lining element. To provide in particular for the axial retention of the individual friction lining elements as well, it is proposed that an area of the material of the pressure plate or flywheel surrounding the recess be deformed or deformable so that it can retain the minimum of one friction lining element. For this purpose, for example, it is possible for the area of the minimum of one friction lining element which fits into the recess to expand toward the base of the recess and/or to be supported on a support element projecting beyond the circumference of the friction lining.

The minimum of one friction lining element can be held in the recess in a manner which makes axial movement essentially impossible.

To achieve an effect equivalent to mounting the lining on springs, the minimum of one friction lining element can be held in the recess with freedom of axial movement. This can be realized, for example, by a design in which the minimum of one friction lining element is or can be supported with respect to the base of the recess by an elastically deformable spring device. The minimum of one friction lining element can be embedded in damping material such as a granulated material.

The minimum of one friction lining element can be essentially circular.

For the sake of withstanding the loads which occur and nevertheless reducing the mass on the transmission input side, it has been found advantageous in a friction clutch designed in accordance with the invention for at least the area of the clutch disk which cooperates with the friction lining element assembly to be made of organic or inorganic material, preferably a ceramic composite material.

The present invention also pertains to a pressure plate or a flywheel on which at least one friction lining element is provided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
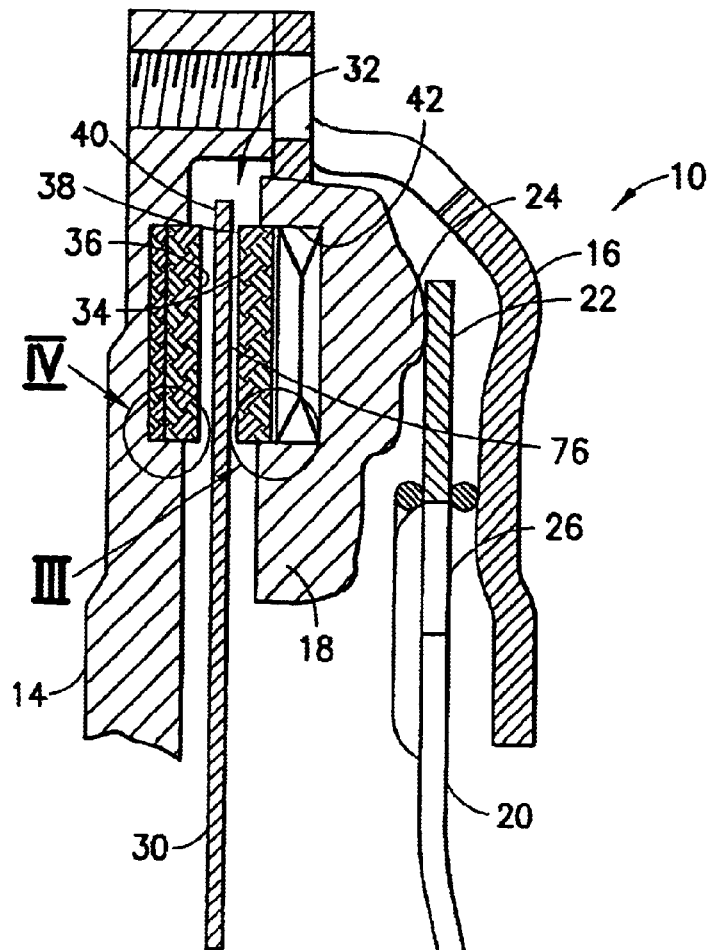
FIG. 1 shows a partial longitudinal cross section of a friction clutch according to the invention.

The friction clutch 10 shown in FIG. 1 comprises a flywheel 14, the radially inner area of which (not shown) is designed for nonrotatable connection to a drive shaft; the flywheel shown can also be part of a dual-mass flywheel. Radially on the outside, the flywheel 14 is nonrotatably connected to a housing 16 by, for example, a plurality of threaded bolts or the like. In the housing 16, a pressure plate 18 is mounted in such a way that it can move in the axial direction relative to the housing 16 and thus also relative to the flywheel 14; that is, it can move toward or away from the flywheel, but is fixed to prevent it from rotating relative to the housing 16 and thus also relative to the flywheel 14. For this purpose, it is possible to provide a connection by way of a plurality of tangential leaf springs.

An energy storing device 20 such as a diaphragm spring, the radially outer area 22 of which contacts an edged area 24 of the pressure plate 18, acts between the pressure plate 18 and the housing 16. The radially middle area 26 of the spring is supported on the housing 16 by, for example, a plurality of spacer pins (not shown) or the like, and its radially inner area 28 can be acted on by a throwout mechanism. The clutch shown in FIG. 1 is of the push type, in which pressure is exerted on the radially inner area 28 of the energy storing device 20 to produce the separating force. This has the effect of moving the radially outer part away from the pressure plate 18. It is obvious to point out that clutches or energy storing devices of the pull type can also be used and that, wear-compensating adjustment devices can be provided between the pressure plate 18 and the energy storing device 20 and also between the energy storing device 20 and the housing 16 to compensate for the wear which occurs during operation and for the associated displacement of the pressure plate 18 toward the flywheel 14.

A clutch disk 30, shown schematically is located between the pressure plate 18 and the flywheel 14. The radially inner area of this disk can be connected to a transmission input shaft, not shown in FIG. 1, in such a way that it can move axially but not rotate.

Figure 2:
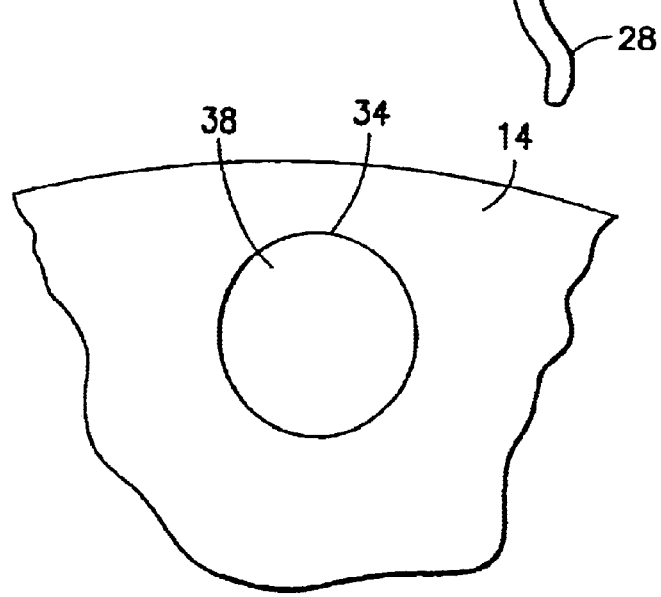
FIG. 2 shows an axial view of part of the flywheel used in the friction clutch according to FIG. 1.

The friction clutch 10 includes a friction lining element assembly 32. This friction lining element assembly comprises a plurality of friction lining elements 34 arranged in sequence around the circumference of both the flywheel 14 and the pressure plate 18. The friction surfaces 36 of the flywheel 14 face corresponding surfaces 38 of the pressure plate 18. When acted upon by the energy storing device 20, the friction lining elements 34 of the pressure plate 18 are pressed against the radially outer area 40 of the clutch disk 30, and thus this radially outer area 40 of the clutch disk 30 is pressed against the friction surfaces 36 of the friction lining elements 34 provided on the flywheel 14. In this way, the frictional interaction is established between the clutch disk 30, which forms the output section of the friction clutch 10, and the flywheel 14 and the pressure plate 18, which form part of the input section of the friction clutch 10. As shown in FIG. 2, the friction lining elements 34 can be circular and can be arranged in sequence around the circumference. It is also possible, however, for the friction lining elements arranged around the circumference to be staggered with respect to each other in the radial direction and/or for the friction lining elements 34 to be designed with some other type of peripheral contour.

The pressure plate 18 and the flywheel 14 are provided with recesses 42, 44, so that the friction lining elements 34 can be attached to them. As will be described below, the friction lining elements 34 are inserted into these recesses in such a way that their friction surfaces 36, 38 project axially from them. The friction lining elements 34 can be installed or fixed in place by, for example, the following method. The flywheel 14 or pressure plate 18 is first heated, and then the individual friction lining elements 34 are inserted into the associated recesses 44, 42 with very little clearance. As the pressure plate 18 or flywheel 14 then cools and shrinks, a rigid clamping effect is achieved. After the friction lining elements have been inserted into the recesses 44, 42, the flywheel 14 or pressure plate 18 can be also be deformed by peening or the like in order to achieve a similar rigid clamping effect in this way.

Figure 3:
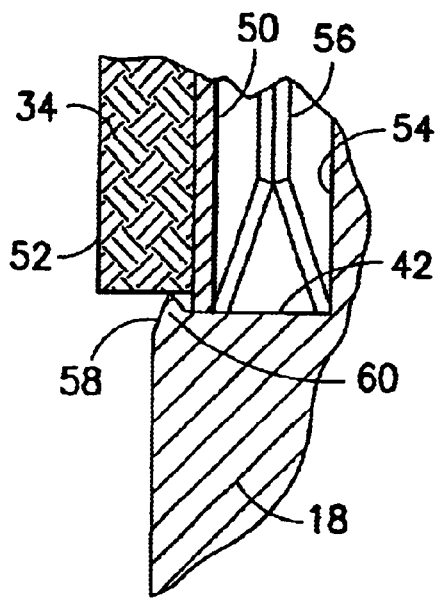
FIG. 3 shows an enlarged view of the detail in circle III of FIG. 1.
Figure 4:
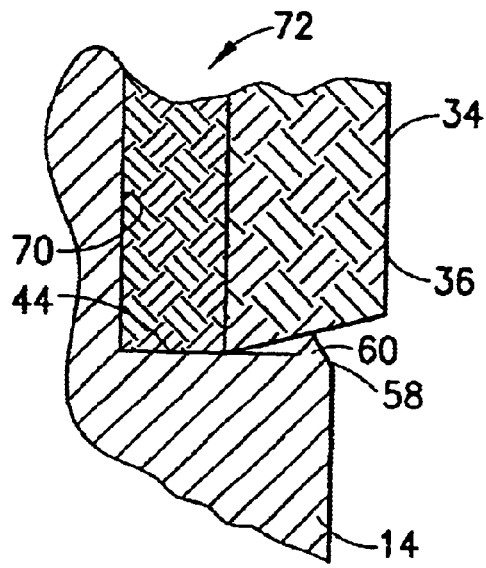
FIG. 4 shows an enlarged view of the detail in circle IV in FIG. 1.

Possible ways in which the friction lining elements 34 can be retained on their associated assemblies while preserving the axial mobility of the friction lining elements 34 relative to the flywheel 14 or pressure plate 18 are illustrated in FIGS. 3 and 4.

FIG. 3 shows how a friction lining element 34 is attached to the pressure plate 18. It is obvious that elements can also be attached in a similar way to the flywheel 14. It can be seen that the friction lining element 34 comprises a lining carrier element 50, to which the friction lining 52 itself is attached by an adhesive. At least certain areas of the circumference of the lining carrier element 50 extend beyond the outer circumference of the friction lining 52 and engage in the recess 42. An axially elastic spring assembly 56, consisting of, for example, one or more cup springs or other elastic elements, is inserted between the lining carrier element 50 and the base of the recess 54. After this spring assembly 56 and the friction lining element 34 have been inserted into the recess 42, the circumferential edge 58 surrounding the recess 42 at the top surface of the pressure plate 18 is at least partially deformed by peening or the like, so that, as a result of the formation of retaining areas 60 projecting over the circumferential edge of the recess 42, the lining carrier element 50 is retained in the recess 42 and is pretensioned by the pretension of the spring assembly 56 against these retaining projections 60.

Figure 5:
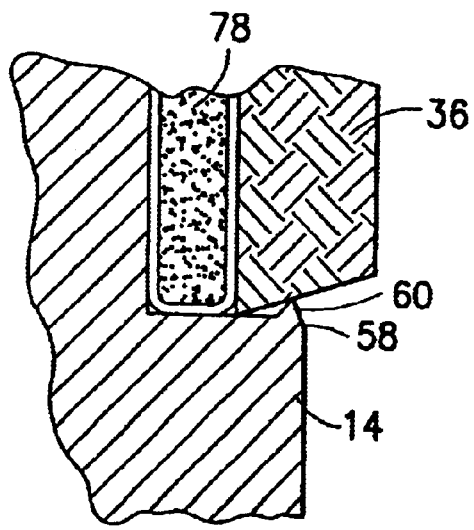
FIG. 5 shows an enlarged view of an alternate detail in Circle IV in FIG. 1.

In the embodiment shown in FIG. 4, the friction lining element 34 has a conical or tapered design, so that it becomes smaller as it proceeds away from the base 70 of the recess 44 and ultimately reaches its smallest circumferential dimension in the area of its friction surface 36. Between the friction lining element 36 and the base 70 of the recess there is a spring device 72, consisting of elastic material such as rubber, which can be permanently attached to the friction lining element 34. By deformation of the circumferential edge area 58, retaining projections 60 are formed here, too, which, in cooperation with the conically tapering external contour of the friction lining elements 34, prevent these elements from falling out of the recesses 44. It should be obvious that cup springs or other types of elastic elements, possibly axially compressed helical compression springs or the like or even an encased granulate 78 (e.g., sand) with a damping action can be used instead of the elastic rubber material. This is shown in FIG. 5.

As already mentioned, the design of the friction clutch 10 according to the invention ensures that the entire mass of the transmission input side and thus also the moment of inertia on that side are reduced, with the result that the synchronizing processes to be performed can be accomplished more quickly and with lighter load on the synchronizing mechanisms. It is especially clear in FIG. 1 that the clutch disk 30 ultimately can be of very simple design. It has proven especially advantageous to use ceramic composite materials such as C/C SiC for the clutch disk 30, at least in the radially outer area of the disk, where it engages in frictional interaction with the friction lining element assembly 32. Globular graphite cast iron (GGG), compacted graphite cast iron (GGV), aluminum, fiber/particle-reinforced aluminum, and aluminum alloys are especially advantageous materials for the flywheel 14 and the pressure plate 16. These materials have greater plasticity than conventional gray cast iron, although it, too, can be used in principle; that is, it is easier to deform these materials to provide the axial retention of the friction lining elements 34. The area of the clutch disk which cooperates with the friction lining elements can also be provided on one or both axial sides with a material compatible with the friction lining elements, as indicated in FIG. 1 at 76 by a thick line. For example, sintered material can be applied, or friction elements attached in some other way can be provided, which are compatible in a frictional sense with the friction lining elements in the pressure plate or flywheel.

It should also be obvious that the clutch disk 30 can be designed as a conventional clutch disk. That it is, it can be provided with a torsional vibration damper to absorb elastically the rotational irregularities which occur while the clutch is rotating without slip.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A friction clutch comprising
   a flywheel having a rotational axis;
   a housing assembly which can be fixed to said flywheel for rotation about said axis;
   a pressure plate mounted in said housing assembly, said pressure plate being axially movable but rotationally fixed relative to said housing assembly;
   means for loading said pressure plate toward said flywheel;
   a clutch disk assembly located between the pressure plate and the flywheel; and
   a friction lining assembly comprising at least one friction lining element on at least one of the pressure plate and the flywheel, each said at least one of the pressure plate and the flywheel comprising at least one integral recess receiving a respective said at least one friction lining element, each said at least one of the pressure plate and the flywheel being formed of a material surrounding each said recess, said material being deformed to project over each said recess to retain each said friction lining element in a respective said recess, said friction lining assembly acting on said clutch disk to transmit torque.

2. A friction clutch as in claim 1 wherein said friction lining assembly comprises a plurality of friction lining elements arranged in circumferential sequence on at least one of the pressure plate and the flywheel.

3. A friction clutch as in claim 1 wherein each said recess has a base, each said friction lining element expanding in the direction of the base of the corresponding recess.

4. A friction clutch as in claim 1 wherein each said friction lining element is supported on a carrier element which projects beyond the friction lining element.

5. A friction clutch as in claim 1 wherein at least one said friction lining element is retained in the recess so that it cannot move axially relative thereto.

6. A friction clutch as in claim 1 wherein each said at least one said friction lining element is retained in the recess so that it can move axially relative thereto.

7. A friction clutch as in claim 6 further comprising an elastically deformable spring assembly supporting each said friction lining element in each said recess.

8. A friction clutch as in claim 6 further comprising a damping material in each said recess.

9. A friction clutch as in claim 8 wherein said damping material comprises a granulate.

10. A friction clutch as in claim 1 wherein each said at least one friction lining element is essentially circular.

11. A pressure plate for a friction clutch, said pressure plate having at least one integral recess and a friction lining element received in each said at least one recess, said pressure plate being formed of a material surrounding each said recess, said material being deformed to project over each said recess to retain each said friction lining element in a respective said recess.

12. A flywheel for a friction clutch, said flywheel having at least one integral recess and a friction lining element received in each said at least one recess, said flywheel being formed of a material surrounding each said recess, said material being deformed to project over each said recess to retain each said friction lining element in a respective said recess.

13. A friction clutch as in claim 1 wherein each said friction lining element is fixed against rotation with respect to said at least one of said pressure plate and said flywheel about said rotational axis.

* * * * *